(12) United States Patent
Kwon

(10) Patent No.: US 6,373,941 B1
(45) Date of Patent: Apr. 16, 2002

(54) TONE GENERATOR FOR ELECTRONIC EXCHANGE

(75) Inventor: Hun-Cheol Kwon, Gumi (KR)

(73) Assignee: Samsung Electronics Co., Ltd.

( * ) Notice: Subject to any disclaimer, the term of this patent is extended or adjusted under 35 U.S.C. 154(b) by 0 days.

(21) Appl. No.: 09/001,470

(22) Filed: Dec. 31, 1997

(30) Foreign Application Priority Data

Dec. 31, 1996 (KR) .............................................. 96-82608

(51) Int. Cl.⁷ ................................................ H04M 3/00
(52) U.S. Cl. ...................................... 379/361; 379/418
(58) Field of Search ................................ 379/361, 350, 379/251, 257, 418

(56) References Cited

U.S. PATENT DOCUMENTS

| | | |
|---|---|---|
| 3,959,604 A | 5/1976 | Newsom et al. |
| 4,056,692 A | 11/1977 | Place |
| 4,070,942 A | 1/1978 | Aoki |
| 4,390,754 A | 6/1983 | Holberg |
| 4,393,740 A | 7/1983 | Niezgonda et al. |
| 4,541,088 A | 9/1985 | Sarson |
| 4,571,723 A | 2/1986 | Lsuignan et al. |
| 4,639,554 A | 1/1987 | Masuda et al. |
| 4,695,804 A | 9/1987 | Bardl et al. |
| 4,907,262 A | 3/1990 | Kwun |
| 5,530,743 A | 6/1996 | Sakurai |
| 5,666,357 A | 9/1997 | Jangi |

*Primary Examiner*—Stella Woo
(74) *Attorney, Agent, or Firm*—Robert E. Bushnell, Esq.

(57) ABSTRACT

A tone supplying device generates various tone signals which an exchange can provide for public subscribers. Address signals generated by a counting operation of a first counter are inputted to a plurality of tone tables, which in turn successively output a tone signal corresponding to each of the address signals and provide same to a corresponding buffer through a corresponding latch. The first counter allows the tone selecting signals and the address signals to be generated in the tone tables so as to successively output corresponding tone signals therefrom and, at the same time, supply the tone selecting signals to the cadence selecting circuit so as to allow the cadence selecting circuit to select any one of cadence data inputted thereto from the cadence table and to output it. Thus, the cadence data selected by the cadence selecting circuit and outputted therefrom intermits tone signals successively outputted from the tone tables, the tone signals being inputted to a corresponding buffer so as to output it to PCM highway. A tone supplying device of the present invention can supply a desired tone using a simple counter without employing an expensive microprocessor in the design of the tone supplying device, thereby to reduce production cost in manufacturng the finished product.

14 Claims, 4 Drawing Sheets

TONE GENERATOR FOR ELECTRONIC EXCHANGE

CLAIM OF PRIORITY

This application makes reference to, incorporates the same herein, and claims all benefits accruing under 35 U.S.C. §119 from an application for *TONE GENERATOR FOR ELECTRONIC EXCHANGE* earlier filed in the Korean Industrial Property Office on the of Dec. 31, 1996 and there duly assigned Ser. No. 82608/1996.

BACKGROUND OF THE INVENTION

1. Technical Field

The present invention relates to an electronic exchange, and more particularly to a tone supplying device for generating several kinds of tone signals which an exchange can provide for public subscribers.

2. Related Art

Generally, a tone supplying device, which is mounted in an exchange, is constructed of a board-type generating dial tone, ring back tone, hold tone, busy tone, trunk line busy tone, warning tone, immediate ring back tone, howling tone, etc.

As described in more detail below, up to this point, tone generators for an electronic exchange have a microprocessor which generates overall control signals and which reads several kinds of tone signals typically stored in a tone memory so as to supply them to a PCM highway. However, in such systems, there has been a drawback in that the tone supplying device has had to operate under the control of the microprocessor, and thus peripheral circuits have been indispensable for the operation of the tone supplying device. This has tended to unnecessarily increase the production cost in the manufacture of such tone generators for electronic exchanges.

The following patents are considered to be representative of the prior art relative to the present invention, but are burdened by the disadvantage discussed above: U.S. Pat. No. 5,666,357 to Jangi, entitled *DTMF Tone PasserIn A Voice Communication System*, U.S. Pat. No. 5,530,743 to Sakurai, entitled *Telephone Exchange Apparatus And Tone Sending Method In Telephone Exchange Apparatus*, U.S. Pat. No. 4,907,262 to Kwun, entitled *Method Of Transmitting Dual Tone Multi-Frequency During Communication In A Private Branch Exchange Using Keyphones*, U.S. Pat. No. 4,695,804 to Bardl et al., entitled *Apparatus For Generating A Multi-Frequency Signal*, U.S. Pat. No. 4,639,554 to Masuda et al., entitled *Dual-Tone Multiple-Frequency-Signal Generating Apparatus*, U.S. Pat. No. 4,571,723 to Lusignan et al., entitled *Pulse Code Modulated Digital Telephony Tone Generator*, U.S. Pat. No. 4,541,088 to Sarson, entitled *Tone Generation Circuit For Automatic PCMK-TDM Telecommunication Exchange*, U.S. Pat. No. 4,393,740 to Niezgoda et aL, entitled *Programmable Tone Generator*, U.S. Pat. No. 4,390,754 to Holberg, entitled *Tone Generator Circuit*, U.S. Pat. No. 4,070,942 to Aoki, entitled *tone Generator*, U.S. Pat. No. 4,056,692 to Place, entitled *Digital Tone Generator*, and U.S. Pat. No. 3,959,604 to Newsom et al., entitled *Digital Calling Signal tone Generating Circuitry*.

SUMMARY OF THE INVENTION

It is, therefore, an object of the present invention to provide a device for supplying a desired tone using a simple counter without employing a high-priced microprocessor in the design of a tone supplying device.

This and other objects of the present invention are attained by providing a tone supplying device for an exchange with a plurality of tone tables for storing a predetermined magnitude of successive tone signals not having a predetermined intermittence ratio in a table form therein, the tone tables being composed of a great number of tone tables depending on the type of tone signal; a cadence table for generating cadence data intermitting the output of the plurality of tone tables including the predetermined magnitude of successive tone signals in a table form; a first counter for allowing the counted output to be divided into more significant bits and less significant bits, and allowing the counting output of the more significant bits to be supplied as an address signal to the plurality of tone tables to enable them, and allowing the less significant bits to be supplied to the plurality of tone tables and the cadence table simultaneously, thereby to output a counting signal so as to generate a tone selecting signal for intermitting a corresponding successive tone signal and the predetermined magnitude of successive tone signals; a second counter for generating an address signal which is a reference of cadence in a regular period, and for supplying the address signal to the cadence table; a plurality of buffers for receiving the successive tone signals outputted each from the plurality of tone tables and storing them therein, and allowing a cadence signal outputted from the cadence table to intermit the stored successive tone signals to output them.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar elements components, wherein.

DETAILED DESCRIPTION OF THE PREFERRED EMBODIMENT

Figure 1:
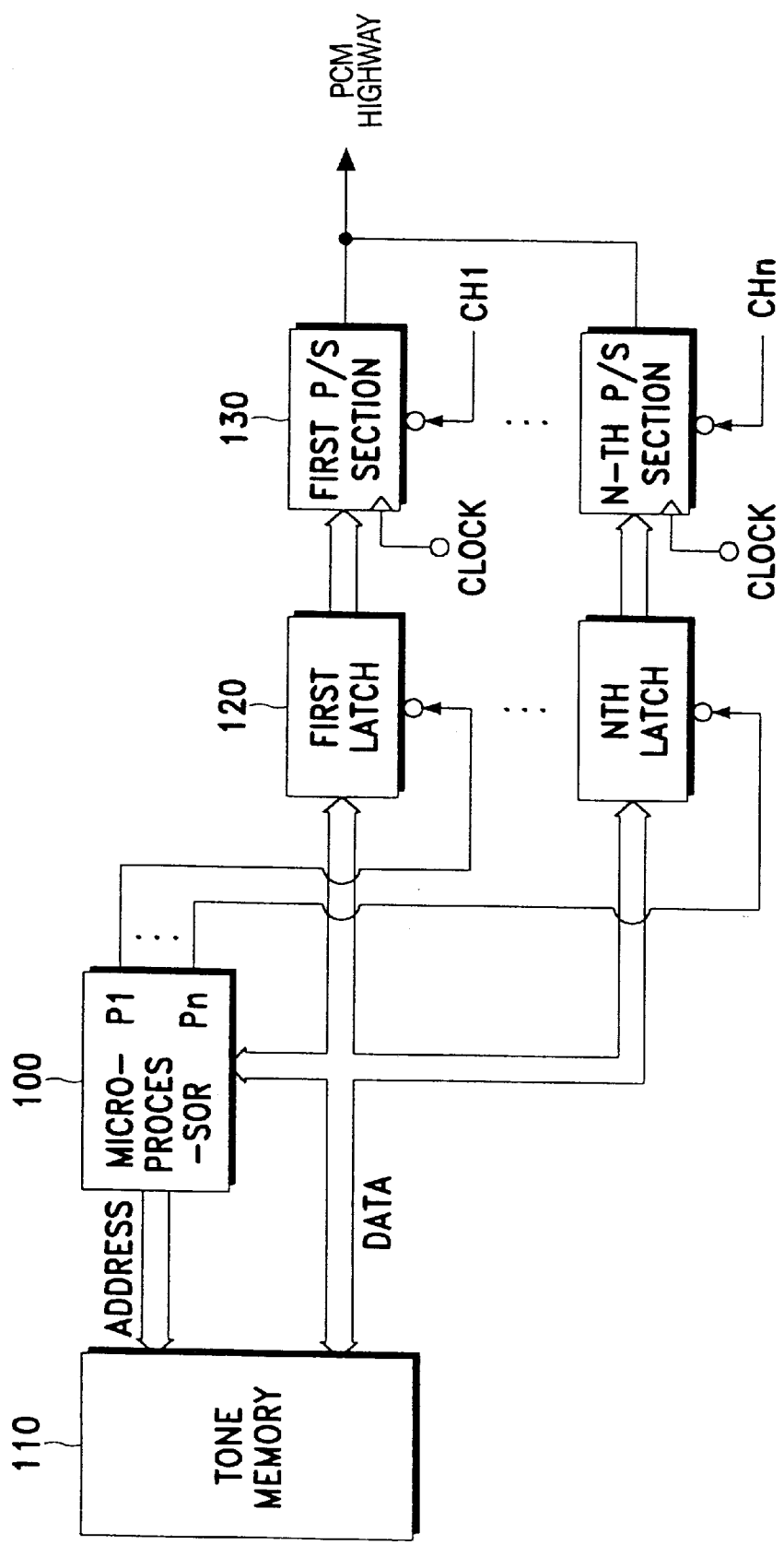
FIG. 1 is a block diagram showing the inner construction of a typical tone supplying device.

Now, a preferred embodiment of the present invention will be described in detail with reference to the accompanying drawings. Throughout the drawings, it is noted that the same reference numerals or letters will be used to designate like or equivalent elements having the same function. In the following description, numeral specific details such as concrete components, expressions are set forth to provide a more through understanding of the present invention. It will be apparent, however, to one skilled in the art that the invention may be practiced without their specific details. The detailed descriptions on known function and constructions unnecessarily obscuring the subject matter of the present invention will be avoided hereinafter. Technical terms as will be mentioned hereinbelow are terms defined in consideration of the function in the present invention, which may be varied according to the intention of user, so the terms should be defined based on the contents across all of this specification.

A tone supplying device will be described hereinafter with reference to FIG. 1, which is a block diagram showing the inner construction of a typical tone supplying device.

Figure 2:
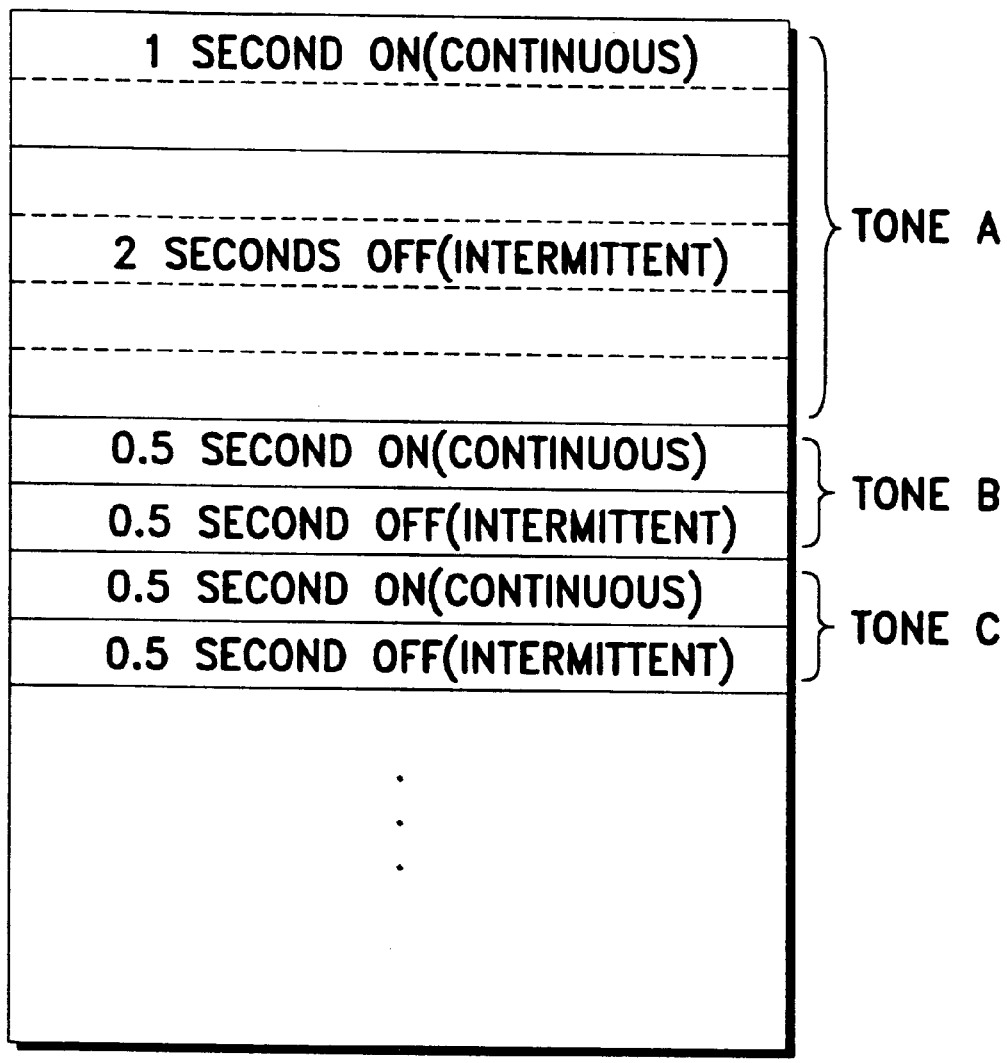
FIG. 2 shows a tone table in a typical tone supplying device.

Referring to FIG. 1, a microprocessor 100 generates the overall control signals in a system and reads several kinds of tone signals stored in a tone memory 110, as will be explained later, to supply them to a PCM highway. Since the tone memory 110 allows tone signals, each having a regular format, in its storage area to be stored in a tone table, as shown in FIG. 2, it can output a corresponding tone signal by using an address signal generated from the microprocessor 100. At this time, the tone table in FIG. 2 stores several kinds of tone signals to be supplied to a system with them being divided into a predetermined intermittence ratio. First~ N-th latches 120, which compensate for the transmission rate between the tone memory 110 and block at the rear stage, temporarily store a corresponding tone signal outputted from the tone memory 110, and then output the stored tone signal by control signals P1–Pn generated from the microprocessor 100. First~ N-th P/S(parallel to serial) sections 130, whose input stage is connected to output stage of each of the first~ N-th latches 120, at the corresponding proportion of 1:1, convert parallel data inputted thereto into serial data, and supply a corresponding tone signal to PCM highway channel at the rear stage thereof under the control of channel control signals CH1~ CHn supplied to each of the first~ N-th P/S sections 130.

However, in such a tone supplying device, there has been a drawback in that the tone supplying device operates under the control of the microprocessor, and thus a peripheral circuit (such as a program ROM, RAM and buffer) is indispensable for the operation of the tone supplying device. As a result, much production cost in manufacturing the finished product is spent.

Figure 3:
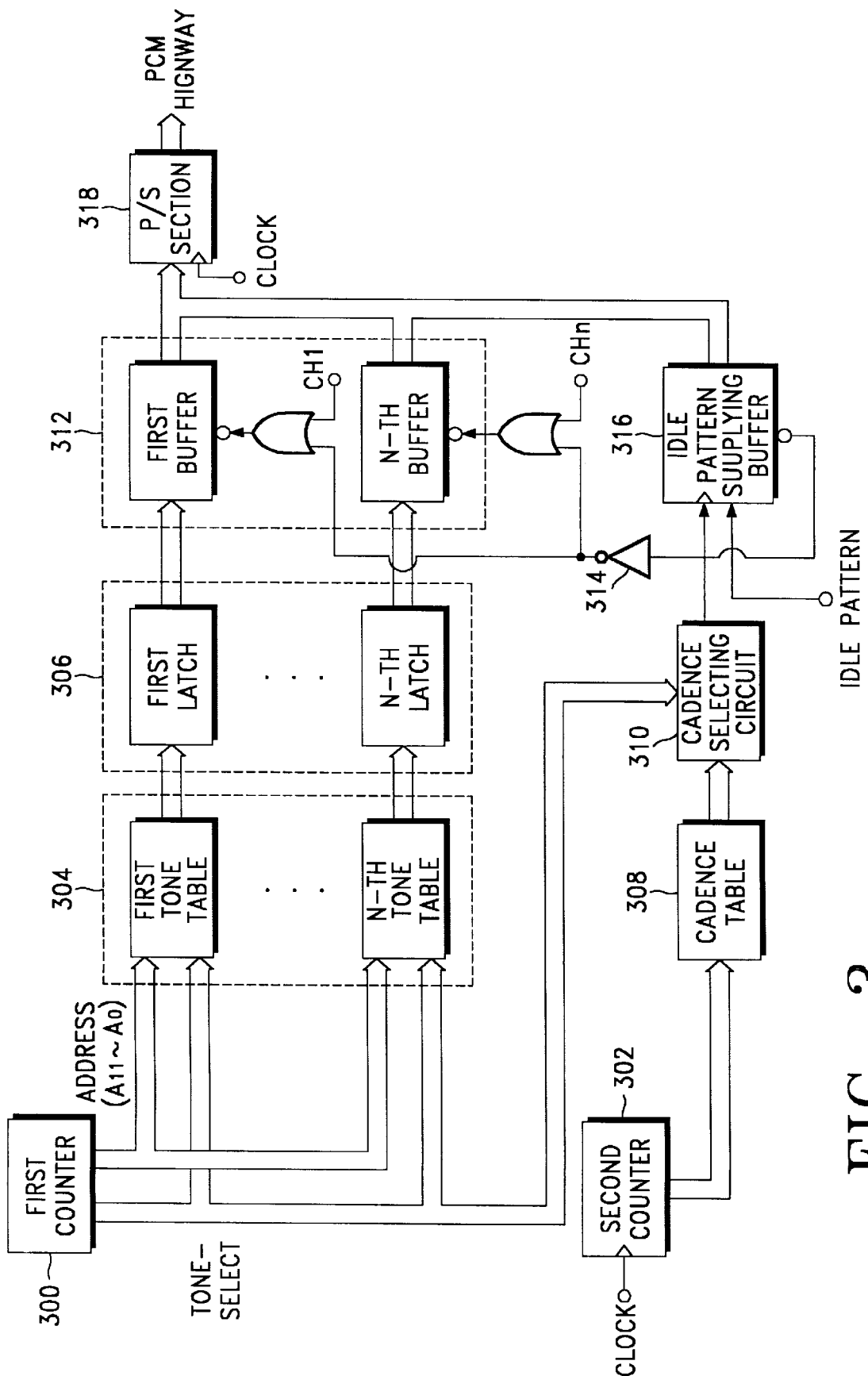
FIG. 3 is a block diagram showing the inner construction of a typical tone supplying device according to a preferred embodiment of the present invention.

FIG. 3 is a block diagram showing the inner construction of a typical tone supplying device according to a preferred embodiment of the present invention.

Referring to FIG. 3, first-Nth tone tables 304 are composed of a great number of tone tables depending on the type of tone signal, and each of them stores a predetermined magnitude of successive tone signals not having a predetermined intermittence ratio in a table form therein. A cadence table 308 (see FIG. 4) generates cadence data for intermitting the output of the plurality of tone tables including the predetermined magnitude of successive tone signals in a table form. Second counter 302 generates an address signal which is a reference of cadence in a regular period, and supplies the address signal to the cadence table 308. First counter 300 allows the counted output to be divided into more significant bits and less significant bits, allows the counted output of the more significant bits as an address signal to be supplied to the plurality of tone tables to enable them, and allows the less significant bits to be supplied to the plurality of tone tables 304 and the cadence table 308 simultaneously to thereby output a counting signal so as to generate a tone selecting signal TONE SELECT for intermitting a corresponding successive tone signal and the predetermined magnitude of successive tone signals. First~ N-th latches 306, which serve to compensate for the transmission rate between the tone tables 304 and blocks at the rear stage, temporarily store a corresponding tone signal outputted from the tone tables 304 to output it to first~ N-th buffers 312. The first~ N-th buffers 312 receive the successive tone signals outputted from each of the tone tables 304 and store them therein, and intermit the stored successive tone signals in a cadence signal outputted from the cadence table 308 to output them. A cadence selecting circuit 310 is disposed between the cadence table 308 and a plurality of buffers 312, and selects cadence data inputted thereto from the cadence table 308 by the tone selecting signal TONE SELECT generated from the first counter 300 to output them. An inverter 314, which is disposed on a load for applying cadence selecting data to be inputted to the plurality of buffers 312, inverts the cadence signal to be inputted, and then combines it with PCM highway channel selecting signal CH1~ CHn to output it to the plurality of buffers 312. An idle pattern supplying buffer 316, which is disposed on a load for applying a cadence signal from the cadence table 308, supplies an idle pattern to allow an "on(continuous)" signal to be selected at all times as only one signal by means of the combined signals so that the idle pattern supplying buffer 316 may be enabled if "on (continuous)" data are applied thereto from the cadence selecting circuit 310 and noise components may not be generated if the tone signal outputted through the plurality of buffers 312 is an "off(intermittent)" signal. A P/S(parallel to serial) section 318 whose input stage is connected to output stage of each of the first~ N-th buffers 312, converts parallel data inputted thereto into serial data, and supplies a corresponding tone signal to a PCM HIGHWAY channel at the rear stage thereof under the control of channel control signals CH1~ CHn supplied thereto.

An explanation of the cadence table 308 will be given in more detail hereinafter with reference to FIG. 4, which shows schematically a cadence table according to a preferred embodiment of the present invention.

Figure 4:
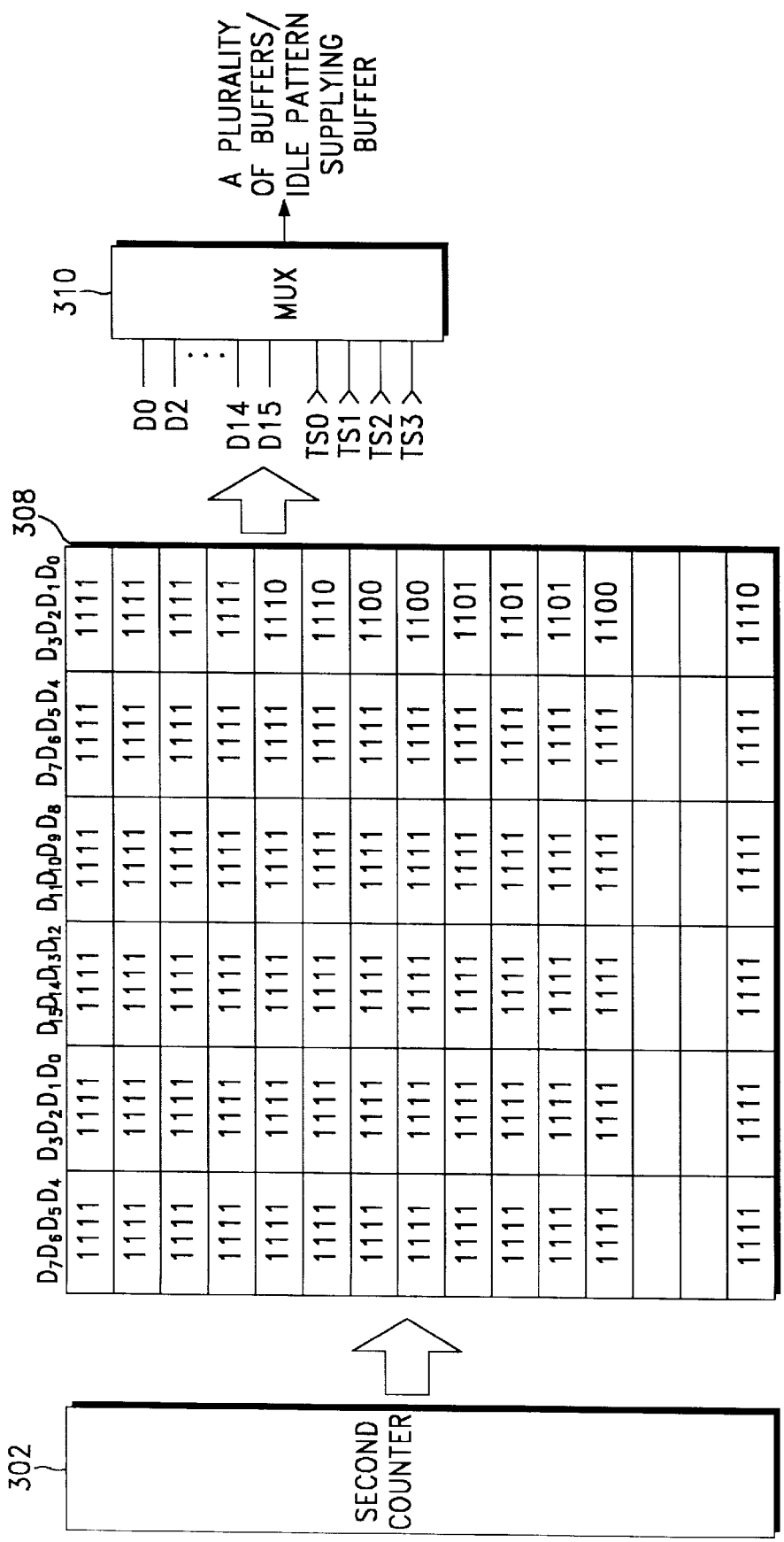
FIG. 4 shows schematically a cadence table according to a preferred embodiment of the present invention.

Referring to FIG. 4, a reference clock supplied to the cadence table 308 from the second counter 302 includes various clocks (such as 25 ms, 50 ms, 100 ms, 200 ms, 400 ms, 800 ms, 1600 ms, 3200 ms, 6400 ms, 12800 ms, 25600 ms and 51200 ms), so that the intermittence time of a column of least significant bit can be determined depending on the selection of the reference clock. Therefore, if a clock which is a reference of a cadence is supplied to the cadence table 308 from the second counter 302 as a reference clock of 25 ms, a column $D_0$ of least significant bit of the cadence table 308 is arranged in the order of 1111→0000→1111→0000, so that the intermittence ratio thereof which is 0.1 second "on(continuous)" /0.1 second "off(intermittent)" is inputted to the cadence selecting circuit 310 at the rear stage thereof.

Accordingly, for data output $D_0$~$D_{15}$ of each different kind of intermittence ratio of the cadence table 308, the intermittence ratio thereof which is determined by the reference clock outputted from the second counter 302 is inputted to the cadence selecting circuit 310. At this time, the data output $D_0$~$D_{15}$ of each different kind of intermittence ratio from the cadence table 308 may be inputted to the cadence selecting circuit 310. Then, the cadence selecting circuit 310 selects one of the inputted data signals $D_0$~$D_{15}$ by use of four tone selecting signals $TS_0$, $TS_1$, $TS_2$, $TS_3$ outputted from the first counter 300, and supplies it to a plurality of buffers 312 as shown in FIG. 2 to thereby allow the buffers 312 to intermit a successive tone signals supplied from the tone tables 304.

As a result, address signals $A_{11\sim A0}$ generated by the counting operation of the first counter 300 are inputted to a plurality of tone tables 304, which in turn successively output a tone signal corresponding to each of the address signals $A_{11\sim A0}$ to a corresponding buffer 312 through a corresponding latch 306. At this time, the first counter 300 allows the tone selecting signals $TS_0$, $TS_1$, $TS_2$, $TS_3$(if the number of tone type is 16) and the address signals $A_{11\sim A0}$ to be generated in the tone tables 304 so as to successively output corresponding tone signals therefrom and, at the same time, supply the tone selecting signals $TS_0$, $TS_1$, $TS_2$, $TS_3$ to the cadence selecting circuit 310 so as to allow the cadence selecting circuit 310 to select any one of cadence data $D_0$~$D_{15}$ inputted thereto from the cadence table 308 for output. Thus, the cadence data selected by the cadence selecting circuit 310 and outputted therefrom intermits tone signals successively outputted from the tone tables 304, followed by their input to a corresponding buffer 312 so as to output it to the PCM highway.

As described above, a tone supplying device of the present invention can supply a desired tone using a simple counter without employing a high-priced microprocessor in the design of the tone supplying device, thereby reducing production cost in manufacturing the finished product.

While there have been illustrated and described what are considered to be preferred embodiments of the present invention, it will be understood by those skilled in the art that various changes and modifications and equivalents maybe substituted for elements thereof without departing from the true scope of the present invention. Therefore, it is intended that the present invention not be limited to the particular embodiments disclosed as the best mode contemplated for carrying out the present invention, but that the present invention embraces all alternatives, modifications and variances falling within the scope of the appended claims.

What is claimed is:

1. A tone supplying device for an exchange, comprising:

a plurality of tone tables for storing a predetermined magnitude of successive tone signals not having a predetermined intermittence ratio in a table form therein, said tone tables comprising a number of tone tables depending on a type of tone signal;

a cadence table for generating cadence data intermitting the output of said plurality of tone tables, including said predetermined magnitude of successive tone signals, in a table form;

first counter means connected to inputs of said plurality of tone tables for performing a counting operation to obtain a counted output which is divided into more significant bits and less significant bits, said more significant bits being supplied as an address signal to said plurality of tone tables to enable them, and said less significant bits being supplied to said plurality of tone tables and said cadence table simultaneously, thereby outputting a counting signal so as to generate a tone selecting signal for intermitting corresponding successive tone signals and said predetermined magnitude of successive tone signals;

second counter means connected to an input of said cadence table for generating an address signal which is a reference of cadence in a regular period, and for supplying said address signal to said cadence table; and a plurality of buffers for receiving and storing the successive tone signals generated by the plurality of tone tables, and for allowing a cadence signal outputted from the cadence table to intermit the stored successive tone signals to output them.

2. The device according to claim 1, further comprising:

inverter means disposed on a line applying a cadence signal to be inputted to said plurality of buffers for inverting the inputted cadence signal so as to provide an inverted cadence signal to said plurality of buffers; and idle pattern supplying buffer means disposed on a line for applying a cadence signal from the cadence table for supplying an idle pattern, the idle pattern supplying buffer means being enabled if "on(continuous)" data are applied thereto, and wherein noise components are not generated if the tone signals outputted through said plurality of buffers comprise an "off(intermittent)" signal.

3. The device according to claim 2, further comprising cadence selecting circuit means disposed between said cadence table and said idle pattern supplying buffer means for applying said "on(continuous)" data to said idle pattern supplying buffer means.

4. The device according to claim 1, further comprising cadence selecting circuit means connected to said cadence table and responsive to a tone-select signal from said first counter means for performing a cadence selection operation.

5. The device according to claim 1, further comprising latch means connected between said plurality of tone tables and said plurality of buffers for performing a latch operation with respect to data provided by said plurality of tone tables to said plurality of buffers.

6. A tone supplying device for an exchange, comprising:

a plurality of tone tables for storing a predetermined magnitude of successive tone signals not having a predetermined intermittence ratio in a table form therein, said tone tables comprising a number of tone tables depending on a type of tone signal;

a cadence table for generating cadence data intermitting the output of said plurality of tone tables, including said predetermined magnitude of successive tone signals, in a table form;

first counter means connected to inputs of said plurality of tone tables for performing a counting operation to obtain a counted output which is divided into more significant bits and less significant bits, said more significant bits being supplied as an address signal to said plurality of tone tables to enable them, and said less significant bits being supplied to said plurality of tone tables and said cadence table simultaneously, thereby outputting a counting signal so as to generate a tone selecting signal for intermitting corresponding successive tone signals and said predetermined magnitude of successive tone signals; and second counter means connected to an input of said cadence table for generating an address signal which is a reference of cadence in a regular period, and for supplying said address signal to said cadence table.

7. The device according to claim 6, further comprising buffer means for receiving and storing the successive tone signals generated by the plurality of tone tables, and for allowing a cadence signal outputted from the cadence table to intermit the stored successive tone signals to output them.

8. The device according to claim 7, further comprising inverter means disposed on a line applying a cadence signal to be inputted to said plurality of buffers for inverting the inputted cadence signal so as to provide an inverted cadence signal to said buffer means.

9. The device according to claim 7, further comprising idle pattern supplying buffer means disposed on a line for applying a cadence signal from the cadence table for supplying an idle pattern, the idle pattern supplying buffer means being enabled if "on (continuous)" data are applied thereto, and wherein noise components are not generated if the tones signals outputted through said plurality of buffers comprises an "off (intermittent)" signal.

10. The device according to claim 9, further comprising latch means connected between said plurality of tone tables and said buffer means for performing a latch operation relative to data passing from said plurality of tone tables to said buffer means.

11. The device according to claim 9, further comprising inverter means disposed on a line applying a cadence signal to be inputted to said buffer means for inverting the inputted cadence signal so as to provide an inverted cadence signal to said buffer means.

12. The device according to claim 9, further comprising cadence selecting circuit means connected between said cadence table and said idle pattern supplying buffer means and responsive to a tone-select signal from said first counter means for performing a cadence selection operation, and for supplying said "on (continuous)" data to said idle pattern supplying buffer means.

13. The device according to claim 7, further comprising latch means connected between said plurality of tone tables and said buffer means for performing a latch operation relative to data passing from said plurality of tone tables to said buffer means.

14. The device according to claim 7, further comprising inverter means disposed on a line applying a cadence signal to be inputted to said buffer means for inverting the inputted cadence signal so as to provide an inverted cadence signal to said buffer means.

* * * * *